United States Patent
Nabeshima et al.

(10) Patent No.: US 10,350,798 B2
(45) Date of Patent: Jul. 16, 2019

(54) MOLDED FOAM MEMBER MANUFACTURING METHOD AND SHOCK ABSORBING MEMBER

(71) Applicant: BRIDGESTONE CORPORATION, Tokyo (JP)

(72) Inventors: Yoichi Nabeshima, Tokyo (JP); Masatoshi Sato, Tokyo (JP); Yoshiyuki Takahashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 288 days.

(21) Appl. No.: 14/908,018

(22) PCT Filed: Jul. 25, 2014

(86) PCT No.: PCT/JP2014/069759
§ 371 (c)(1),
(2) Date: Jan. 27, 2016

(87) PCT Pub. No.: WO2015/016157
PCT Pub. Date: Feb. 5, 2015

(65) Prior Publication Data
US 2016/0167263 A1    Jun. 16, 2016

(30) Foreign Application Priority Data
Jul. 31, 2013    (JP) ................. 2013-159774

(51) Int. Cl.
*B29C 44/12* (2006.01)
*B29C 44/40* (2006.01)
(Continued)

(52) U.S. Cl.
CPC ...... *B29C 44/1233* (2013.01); *B29C 44/1271* (2013.01); *B29C 44/1285* (2013.01);
(Continued)

(58) Field of Classification Search
CPC ............ B29C 44/1223; B29C 44/1271; B29C 44/1285; B29C 44/40; B29C 44/1214;
(Continued)

(56) References Cited

U.S. PATENT DOCUMENTS 3,929,948 A  * 12/1975  Welch ................. B29C 44/0461
                                                         264/45.5
4,904,429 A    2/1990  Takahashi et al.
(Continued)

FOREIGN PATENT DOCUMENTS

GB    2306910 A    5/1997
JP    8-244047 A   9/1996
(Continued)

OTHER PUBLICATIONS

International Search Report of PCT/JP2014/069759, dated Oct. 28, 2014. [PCT/ISA/210].
(Continued)

*Primary Examiner* — Robert C Dye
*Assistant Examiner* — Sonny V Nguyen
(74) *Attorney, Agent, or Firm* — Sughrue Mion, PLLC (57) ABSTRACT

A molded foam member manufacturing method including: a first process of placing a foam molded first portion and a rigid member in a second portion forming mold, and pressing and fixing the rigid member against the second portion forming mold; and a second process of pouring a second portion-forming synthetic resin raw material into the second portion forming mold and foam molding a second portion so as to surround at least a portion of the rigid member and to form an integral unit with the first portion.

6 Claims, 6 Drawing Sheets

(51) Int. Cl.
*B29C 39/10* (2006.01)
*B29L 31/30* (2006.01)
*B29K 105/04* (2006.01)

(52) U.S. Cl.
CPC .............. *B29C 44/40* (2013.01); *B29C 39/10* (2013.01); *B29K 2105/04* (2013.01); *B29L 2031/30* (2013.01); *B29L 2031/3005* (2013.01)

(58) Field of Classification Search
CPC ....... B29C 39/10; B29C 39/126; B29C 45/14; B29C 45/14065; B29C 45/2045; B29C 45/14098; B29C 45/14122; B29C 45/14131; B29C 45/14139; B60R 21/04
See application file for complete search history.

(56) References Cited

U.S. PATENT DOCUMENTS

| | | | |
|---|---|---|---|
| 5,017,115 A | 5/1991 | Yanagishita et al. | |
| 5,043,114 A | 8/1991 | Saito et al. | |
| 5,527,502 A * | 6/1996 | Kiuchi | B29C 33/126 |
| | | | 264/250 |
| 6,082,683 A * | 7/2000 | Yates | A47B 21/0371 |
| | | | 156/145 |
| 2001/0028130 A1* | 10/2001 | Yagi | B29C 45/14065 |
| | | | 264/255 |
| 2011/0233962 A1* | 9/2011 | Tada | B60J 5/0451 |
| | | | 296/187.12 |
| 2012/0286445 A1 | 11/2012 | Ohta | |

FOREIGN PATENT DOCUMENTS

| | | |
|---|---|---|
| JP | 9-207696 A | 8/1997 |
| JP | 2007-22146 A | 2/2007 |
| JP | 2010-17392 A | 1/2010 |
| JP | 2010-52267 A | 3/2010 |
| JP | 2011-121485 A | 6/2011 |
| JP | 2012-236285 A | 12/2012 |
| JP | 2013-40625 A | 2/2013 |
| JP | 2014-140975 A | 8/2014 |

OTHER PUBLICATIONS

Written Opinion of PCT/JP2014/069759, dated Oct. 28, 2014. [PCT/ISA/237].

* cited by examiner

MOLDED FOAM MEMBER MANUFACTURING METHOD AND SHOCK ABSORBING MEMBER

CROSS REFERENCE TO RELATED APPLICATIONS

This application is a National Stage of International Application No. PCT/JP2014/069759 filed Jul. 25, 2014, claiming priority based on Japanese Patent Application No. 2013-159774, filed Jul. 31, 2013, the contents of all of which are incorporated herein by reference in their entirety.

TECHNICAL FIELD

The present invention relates to a manufacturing method for a molded foam member and a shock absorbing member.

BACKGROUND ART

Shock absorbing members formed from molded foam members such as hard polyurethane foams are attached to automobile doors in order to absorb impact energy in the event of a side-on collision.

Structures have been proposed for improving shock absorption performance by providing a rigid member with higher rigidity than a molded foam member at an impact receiving face of the molded foam member. For example, shock absorbing members exist that have a structure in which a molded foam member is affixed to one face of a rigid member such as an iron plate.

Japanese Patent Application Laid-Open (JP-A) No. 2011-121485 describes a configuration in which a molded foam member is formed at both faces of an iron plate in a structure in which the iron plate is provided with through holes, through which foam moldable resin flows.

However, during molding of the molded foam member, there is a concern of the iron plate being lifted up by foaming pressure of a foaming agent, and of positional displacement arising between the molded foam member and the iron plate inside the mold.

SUMMARY OF INVENTION

Technical Problem

In consideration of the above circumstances, an object of the present invention is to suppress positional displacement of a rigid plate due to foaming pressure, and to mold a molded foam member with good precision at both faces of the rigid plate.

Solution to Problem

A molded foam member manufacturing method according to a first aspect includes: a first process of placing a foam molded first molded body and a rigid plate in a forming mold, and pressing and fixing the rigid plate against the first molded body; and a second process of pouring a foaming agent into the forming mold and foam molding a second molded body so as to surround at least a portion of the rigid plate and to form an integral unit with the first molded body.

In this molded foam member manufacturing method, the foam molded first molded body and the rigid plate are placed in the forming mold, and the foaming agent is poured in to foam mold the second molded body, thereby rendering a process to affix the first molded body and the second molded body to the rigid plate unnecessary. Moreover, since the rigid plate is pressed against and fixed to the first molded body, the rigid plate is not lifted up by foaming pressure, and the first molded body supports the rigid plate during placement, thereby enabling relative positional displacement between the first molded body, the rigid plate, and the second molded body to be suppressed.

In a molded foam member manufacturing method according to a second aspect, when closing an upper mold configuring the forming mold so as to form a cavity, the rigid plate is pressed against a lower mold configuring the forming mold by a restriction protrusion provided at the upper mold.

In this molded foam member manufacturing method, the rigid plate is pressed against the lower mold by the restriction protrusion provided at the upper mold when the foaming agent is poured into the mold the second molded body is foam molded, thereby enabling the rigid plate to be suppressed from being lifted up by the foaming pressure.

In a molded foam member manufacturing method according to a third aspect, the first molded body is formed with a support protrusion supporting the rigid plate.

In this molded foam member manufacturing method, the support protrusion provided at the first molded body supports the rigid plate, thereby enabling positional displacement between the rigid plate and the first molded body to be suppressed.

In a molded foam member manufacturing method according to a fourth aspect, the support protrusion is positioned so as to oppose the restriction protrusion in plan view.

In this molded foam member manufacturing method, the support protrusion and the restriction protrusion support the rigid plate from each side, thereby enabling the rigid plate to be stably fixed.

In a molded foam member manufacturing method according to a fifth aspect, a recess is provided at the first molded body that contacts the rigid plate, and in the process in which the foaming agent is poured into the forming mold, the foaming agent that has flowed around the rigid plate flows into the recess.

In this molded foam member manufacturing method, liquid foaming agent that has flowed around the rigid plate flows into the recess provided at the first molded body when the foaming agent is poured into the mold and the second molded body is foam molded, thereby enabling overflow of the foaming agent to be suppressed from flowing to an outer peripheral face of the first molded body and foaming between the mold and the first molded body.

In a molded foam member manufacturing method according to a sixth aspect, a magnet is provided in the forming mold for adhering to an exposed portion of the rigid plate.

In this molded foam member manufacturing method, for example, positioning the rigid plate configured from a magnetic material using the adhesion of the magnet disposed in the mold enables the positioning precision of the rigid plate to be improved.

A shock absorbing member according to a seventh aspect is manufactured using the molded foam member manufacturing method of any one of the first aspect to the second aspect.

This shock absorbing member enables impact force to be absorbed in two stages by the first molded body and the second molded body. After one of the molded bodies has absorbed impact and been squashed, the impact is transmitted to the other molded body through the rigid plate, enabling the other molded body to absorb the impact while maintaining a constant orientation. The rigid plate is suppressed from lifting up at such times, thereby enabling an improvement in positioning precision.

Advantageous Effects of Invention

Due to the above configuration, the present invention is capable of suppressing positional displacement of a rigid plate due to foaming pressure, and also capable of molding a molded foam member with good precision at both faces of the rigid plate.

DESCRIPTION OF EMBODIMENTS

Explanation follows regarding the structure of a manufacturing method of a molded foam member according to an exemplary embodiment, with reference to the drawings.

Explanation follows regarding an exemplary embodiment, with reference to the drawings. Note that in the following exemplary embodiment, explanation is given regarding an example in which a shock absorbing member (abbreviated below to "EA member") attached to the inside an automobile door is employed as the molded foam member. However, the present invention is also applicable to other molded foam members and their manufacturing methods.

Figure 1:
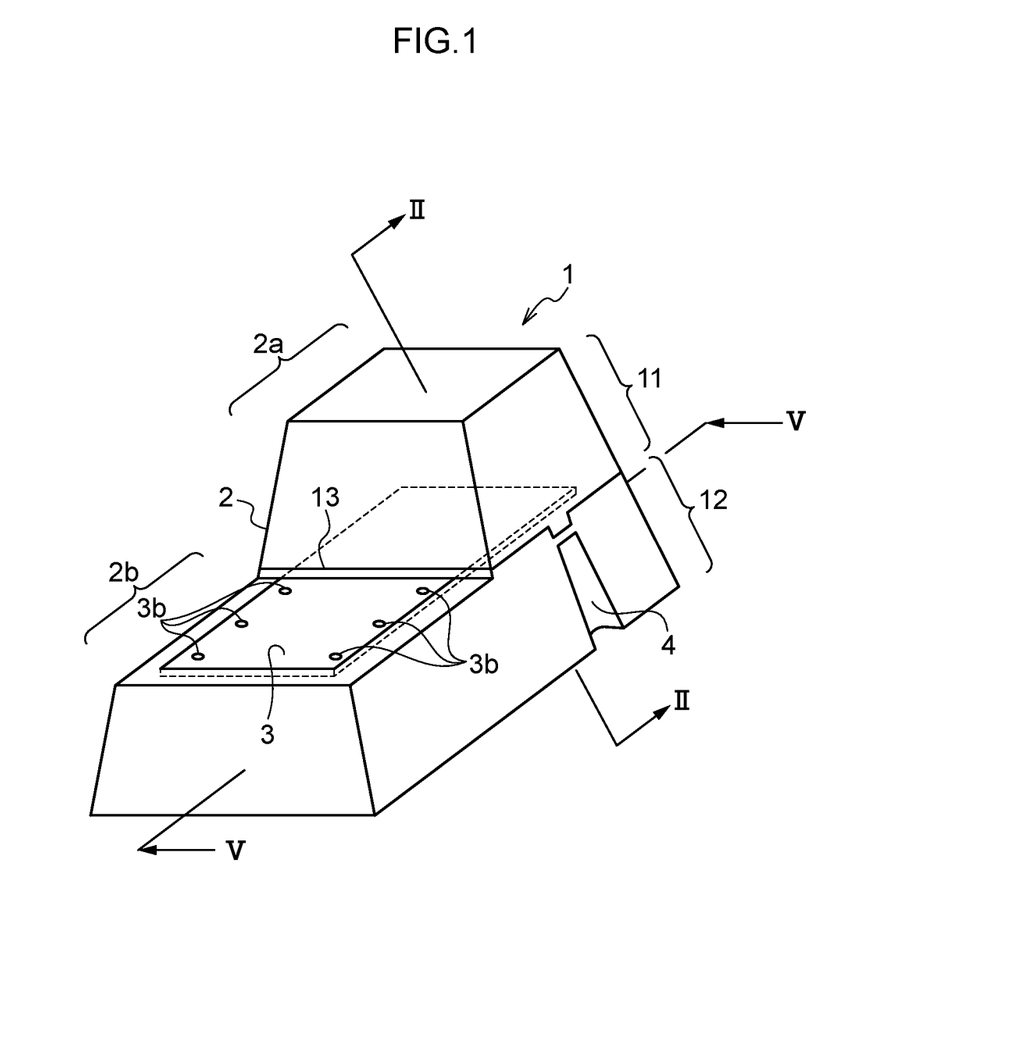
FIG. 1 is a perspective view of a molded foam member according to an exemplary embodiment.
Figure 2:
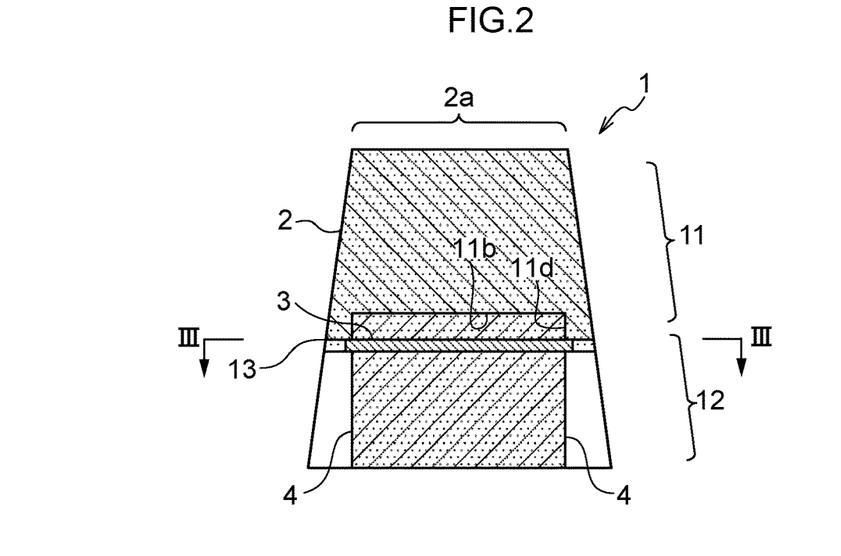
FIG. 2 is a cross-section of the molded foam member illustrated in FIG. 1, as seen from line II-II.
Figure 3:
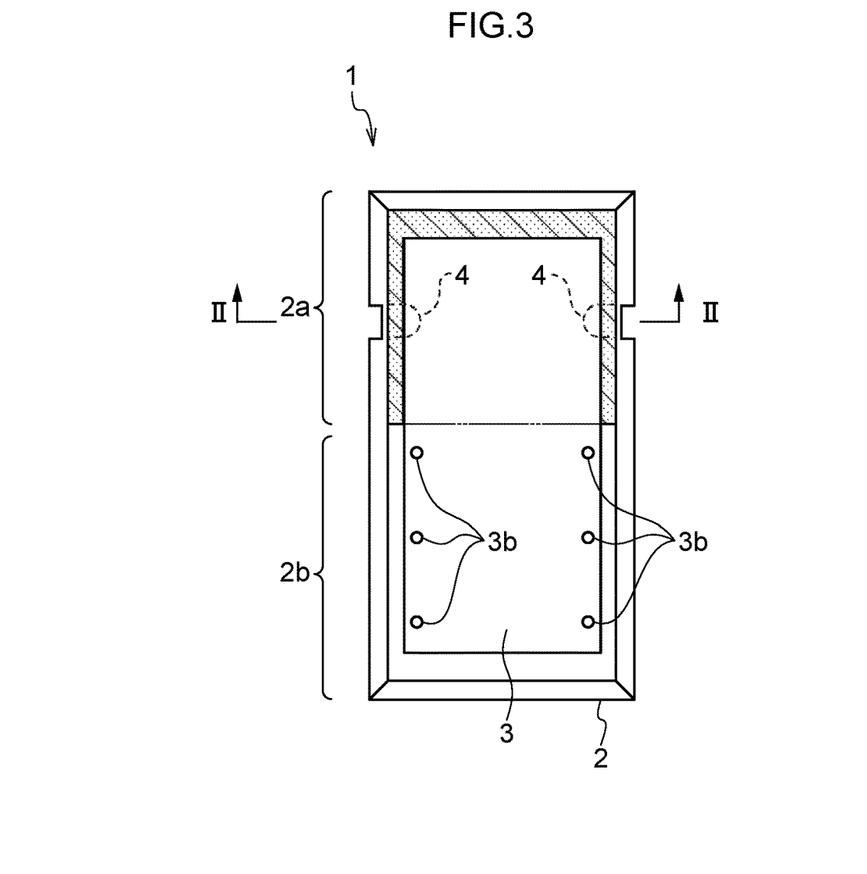
FIG. 3 is a cross-section of a second portion of the molded foam member illustrated in FIG. 1, as seen from line III-III in FIG. 2.
Figure 4:
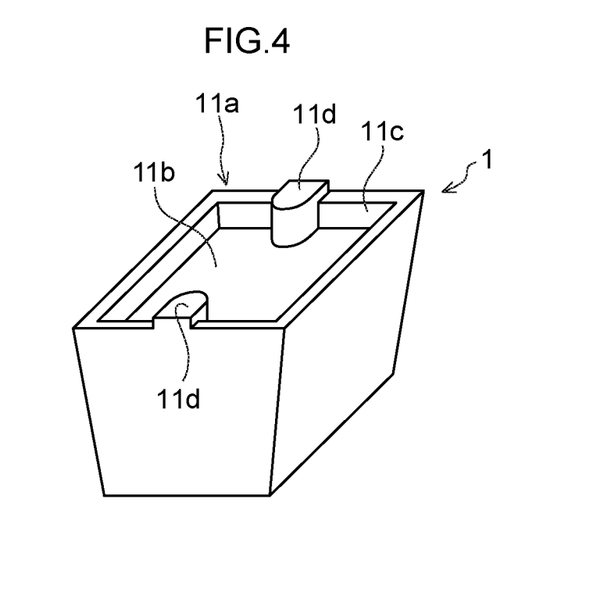
FIG. 4 is a perspective view of a first portion of the molded foam member illustrated in FIG. 1, as viewed along a joining direction of a rigid member.
Figure 5:
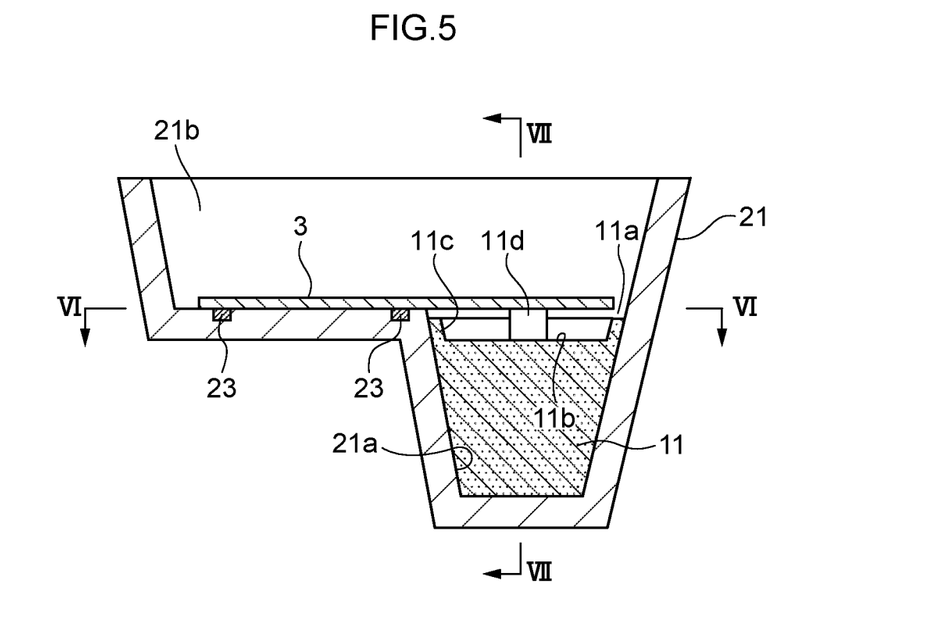
FIG. 5 is a cross-section of a second portion forming mold in manufacture of the molded foam member illustrated in FIG. 1, as seen from line V-V.
Figure 6:
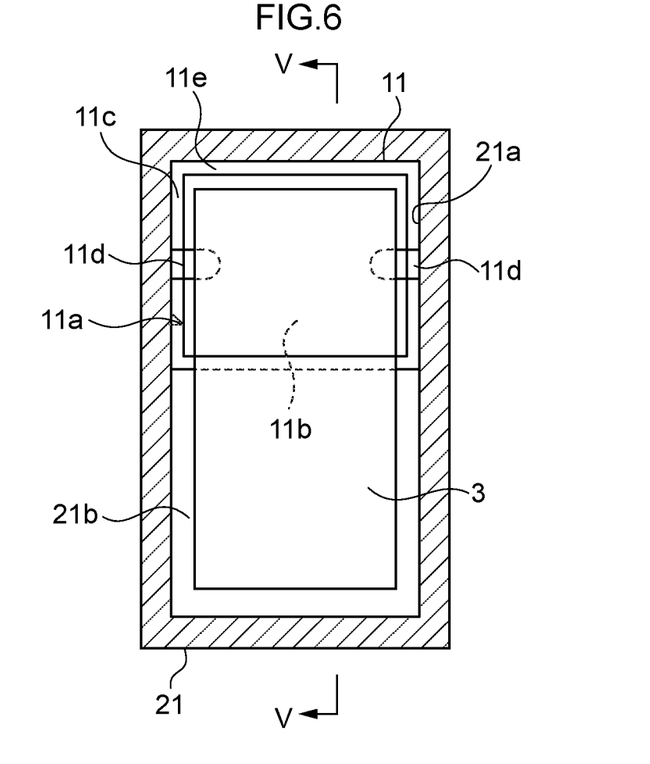
FIG. 6 is a cross-section of a second portion forming mold in manufacture of the molded foam member illustrated in FIG. 1, viewed at line III-III in FIG. 2 from the side of a first portion.
Figure 7:
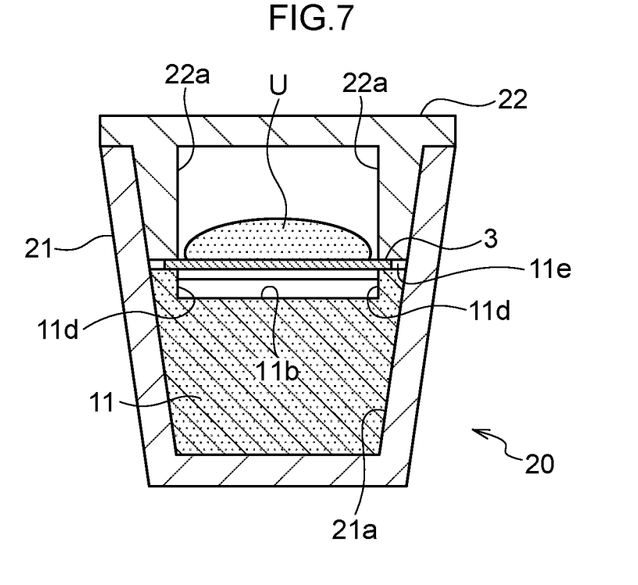
FIG. 7 is a cross-section of a second portion forming mold in manufacture of the molded foam member illustrated in FIG. 1, as seen from line VII-VII in FIG. 5.

FIG. 1 is a perspective view illustrating an EA member 1 (shock absorbing member) serving as a molded foam member according to an exemplary embodiment. FIG. 2 and FIG. 3 are respective cross-sections of the EA member. Note that FIG. 2 is a cross-section taken along lines II-II in FIG. 1 and FIG. 3, and FIG. 3 is a cross-section taken along line III-III in FIG. 2. FIG. 4 is a perspective view illustrating a first portion 11 (first molded body) of the EA member. FIG. 5 to FIG. 10 are respective cross-sections of a mold, and illustrate a manufacturing method of the EA member (metal molds are preferable; however, other materials may also be employed). Note that FIG. 5 and FIG. 8 to FIG. 10 respectively illustrate cross-sections of a portion along line V-V in FIG. 6, FIG. 6 illustrates a cross-section of a portion along line VI-VI in FIG. 5, and FIG. 7 illustrates a cross-section of a portion along line VII-VII in FIG. 5.

EA Member 1 Configuration

In the present exemplary embodiment, a lower face of the EA member 1 illustrated in FIG. 1 and FIG. 2 faces a door inner face when the EA member 1 is attached inside the door. For simplicity, in the following explanation, the door inner face side of the EA member 1 (the lower side in FIG. 1 and FIG. 2) is referred to as the base end side, and the opposite side to door trim (the upper side in FIG. 1 and FIG. 2) is referred to as the leading end side. The direction from the base end side toward the leading end side (or the opposite direction thereto) is referred to as the thickness direction.

The EA member 1 includes an EA member body 2, serving as a molded foam member that is foam molded from a synthetic resin raw material such as a hard polyurethane, and a rigid member 3 (rigid plate), serving as an embedded member that is at least partially embedded in the EA member body 2.

In the present exemplary embodiment, the EA member body 2 includes a large thickness portion 2a that has a large thickness (a large size from the base end side to the leading end side), and a small thickness portion 2b that has a smaller thickness than the large thickness portion 2a. As illustrated in FIG. 1, the large thickness portion 2a and the small thickness portion 2b are respectively disposed adjacent to each other in a direction orthogonal to the thickness direction. For simplicity, in the following explanation the direction in which the large thickness portion 2a and the small thickness portion 2b are adjacent to each other is referred to as the length direction of the EA member body 2, and a direction orthogonal to both the length direction and the thickness direction is referred to as the width direction of the EA member body 2. As illustrated in FIG. 1, respective base end side end faces (referred to below as the base end faces) of the large thickness portion 2a and the small thickness portion 2b are contiguous to each other in a substantially coplanar shape, and a leading end side end face of the small thickness portion 2b (referred to below as the leading end face) is at a step back toward the base end side compared to the leading end face of the large thickness portion 2a. Note that the shape of the EA member body 2 is not limited thereto.

In the present exemplary embodiment, due to the presence of rigid member restraint protrusions 22a (restriction protrusions) in a second portion forming mold 20 (forming mold, referred to below simply as "mold") during a second portion forming process, described later, side faces of both width direction end sides of the base end side of the large thickness portion 2a are respectively formed with recesses 4 due to the side faces of the large thickness portion 2a being formed with indentations in the shape of the rigid member restraint protrusions 22a. Note that the shape of the EA member body 2 is not limited thereto.

As illustrated in FIG. 1 to FIG. 3, in the present exemplary embodiment, a rigid member 3 (rigid plate) is a metal plate member disposed straddling between the large thickness portion 2a and the small thickness portion 2b. One portion of the rigid member 3 is embedded in the large thickness portion 2a, and another portion of the rigid member 3 is embedded in the small thickness portion 2b. The surface of the rigid member 3 is partially exposed.

As illustrated in FIG. 1 to FIG. 3, in the present exemplary embodiment, the rigid member 3 has a flat plate shape, and a plate face thereof is disposed in a direction substantially parallel to leading end faces of both the large thickness portion 2a and the small thickness portion 2b. As illustrated in FIG. 1, in the present exemplary embodiment, a portion of the rigid member 3 is disposed so as to cover across the leading end face of the small thickness portion 2b, and is effectively embedded inside the small thickness portion 2b by its own thickness, such that the plate face (referred to below as the leading end side plate face) of the rigid member 3 is exposed at the leading end face of the small thickness portion 2b. The exposed leading end side plate face of the rigid member 3 and the leading end face of the small thickness portion 2b have substantially coplanar profiles. Note that the placement of the rigid member 3 is not limited thereto, and for example, the rigid member 3 may be embedded in the small thickness portion 2b such that at least a portion of the leading end side plate face is covered by the foamed synthetic resin configuring the small thickness portion 2b.

As illustrated in FIG. 1 to FIG. 3, a portion of the rigid member 3 is embedded in the large thickness portion 2a partway along the thickness direction. In the present exemplary embodiment, the side of the rigid member 3 that is embedded in the large thickness portion 2a is provided with a through hole 3a penetrating the rigid member 3 in the thickness direction. During the second portion forming process, described later, second portion-forming synthetic resin raw material U (foaming agent) that is fed in further to the base end side (the side of a second portion 12, described later) of the large thickness portion 2a than the rigid member 3 is also fed in to a leading end side (the side of a first portion 11, described later) of the large thickness portion 2a through the through hole 3a. Moreover, second portion-forming synthetic resin raw material U that is fed in further to the leading end side of the large thickness portion 2a than the rigid member 3 and foamed, expands as far as the base end side of the large thickness portion 2a through the through hole 3a.

As illustrated in FIG. 1 to FIG. 3, in the present exemplary embodiment, an outer peripheral edge of the rigid member 3 is not exposed, and is embedded within the EA member body 2. Note that the outer peripheral edge may also be exposed rather than embedded.

Namely, in the present exemplary embodiment, during a placement process, described later, when the rigid member 3 is being placed inside the mold 20, configuration is made such that a gap 11e, illustrated in FIG. 3, is formed between the outer peripheral edge of the rigid member 3 and a cavity inner face of the mold 20. Accordingly, in the second portion forming process, around the foaming time, the second portion-forming synthetic resin raw material U is able to flow through the gap 11e from the base end side to the leading end side of the rigid member 3 in the large thickness portion 2a, or vice-versa. Side peripheral faces of the EA member body 2 are formed from foamed synthetic resin due to the gap 11e being filled with foamed synthetic resin.

Note that in a state in which the rigid member 3 has been placed in the mold 20, the gap 11e between the outer peripheral edge of the rigid member 3 and the cavity inner face of the mold 20 is in a range of from 5 mm to 50 mm, and in particular, is preferably in a range of from 10 mm to 20 mm.

As illustrated in FIG. 1 and FIG. 3, in the present exemplary embodiment, small holes 3b are provided on the small thickness portion 2b side of the rigid member 3. The small holes 3b are preferably through holes that penetrate the rigid member 3, but may be recesses with non-penetrating shapes. In the second portion forming process, the foamed synthetic resin enters the small holes 3b, thereby improving the join strength between the rigid member 3 and the small thickness portion 2b. The diameter of each of the small holes 3b is from 1 mm to 10 mm, and in particular, is preferably from 2 mm to 5 mm. As illustrated in FIG. 1 and FIG. 3, in the present exemplary embodiment, three of the small holes 3b are provided with circular shapes along edges on the two sides of the rigid member 3; however, the shape, number, and placement of the small holes 3b are not particularly limited.

Examples of materials for configuring the rigid member 3 include sheet metal such as an iron plate or an aluminum plate, or a resin plate. An iron plate is particularly preferably employed. The thickness of the rigid member 3 is preferably in a range of from 0.3 mm to 5.0 mm, and is more preferably in a range of from 0.6 mm to 1.6 mm.

The configuration and placement of the rigid member 3 are not limited to the above. For example, outer peripheral edges of the rigid member 3 may be at least partially exposed at the side peripheral faces of the EA member body 2. A portion of the rigid member 3 may extend out to the outside of the EA member body 2. For example, configuration may be made in which a peripheral edge portion is provided with notches, or a portion of an end face may be pressed against the inside of the cavity such that the second portion-forming synthetic resin raw material U does not enter. In the second portion forming process, configuration may be made such that the second portion-forming synthetic resin raw material U is made to flow between the outer peripheral edge of the rigid member 3 mentioned above and the cavity inner face of the mold 20 through the gap 11e. Outer peripheral edges of the rigid member 3 may be at least partially exposed at the side peripheral faces of the EA member body 2. A portion of the rigid member 3 may extend out to the outside of the EA member body 2. The rigid member 3 may be configured with a shape other than a flat plate shape. The rigid member 3 may be configured with a shape other than a flat plate shape.

In the present exemplary embodiment, a portion of the large thickness portion 2a of the EA member body 2 that is further to the leading end side than a thickness direction intermediate portion configures the first portion 11, this being prepared in a first portion preparation process, described later. A portion of the large thickness portion 2a of the EA member body 2 that is further to the base end side than the thickness direction intermediate portion, and the small thickness portion 2b, are formed integrally to one another as the foam molded second portion 12 (second molded body) during the second portion forming process, described later. The first portion 11 and the second portion 12 are adjacent to each other, and during the second portion forming process, the second portion-forming synthetic resin raw material U contacts the first portion 11 so as to form a welded body. In FIG. 1 and FIG. 2, the reference numeral 13 indicates a boundary portion between the first portion 11 and the second portion 12.

In the present exemplary embodiment, as illustrated in FIG. 1 and FIG. 2, the first portion 11 configures a portion of the large thickness portion 2a that is further to the leading end side of the large thickness portion 2a than the rigid member 3 embedded in the large thickness portion 2a. Namely, the rigid member 3 is not embedded in the first portion 11, and is separated by a specific spacing therefrom. This spacing is preferably approximately 0.5 mm to 10 mm, and is 5 mm in the present exemplary embodiment. The rigid member 3 is, as a whole, embedded in the second portion 12 at the vicinity of the boundary between the first portion 11 and the second portion 12. Note that the partitioned structure of the first portion 11 and the second portion 12 is not limited thereto.

FIG. 4 illustrates the first portion 11 prior to being integrated together with the second portion 12. In FIG. 4, the first portion 11 is shown with a second portion 12-boundary face (referred to below simply as "boundary face") 11a facing upward.

In the present exemplary embodiment, when the first portion 11 has been placed in a space corresponding to the first portion inside the cavity of the mold 20 during the placement process, described later, as illustrated in FIG. 5, at least a portion of the boundary face 11a is configured so as to be separated from an opposing face of the rigid member 3 that is placed in a space corresponding to the rigid member inside the cavity.

In the present exemplary embodiment, the boundary face 11a of the first portion 11 is provided with a recess 11b that is sunken by approximately 1 mm to 10 mm in a direction away from the rigid member 3. In the present exemplary embodiment, the depth of the recess 11b is 5 mm. The recess 11b is provided at a position separated from outer peripheral edges of the boundary face 11a, toward a central side of the boundary face 11a. Further to the peripheral outside than the recess 11b, the boundary face 11a is configured with an embankment-shaped portion 11c that is a step higher toward the rigid member 3 side. The embankment-shaped portion 11c is formed following the outer peripheral edges of the boundary face 11a so as to enclose the entire periphery of the recess 11b. In the present exemplary embodiment, as illustrated in FIG. 5, the embankment-shaped portion 11c is configured with a height such that a crest thereof does not contact the rigid member 3 during the placement process.

In the second portion forming process, the second portion-forming synthetic resin raw material U fed in further to the second portion 12 side than the rigid member 3 passes the gap 11e between the rigid member 3 and the cavity inner face of the mold 20, and flows around to the first portion 11 side of the rigid member 3. Configuration is made such that when this occurs, the embankment-shaped portion 11c formed around the outer peripheral edge of the boundary face 11a prevents or suppresses the second portion-forming synthetic resin raw material U from entering between a side peripheral face of the first portion 11 and the cavity inner face of the mold 20, such that the second portion-forming synthetic resin raw material U remains within the recess 11b. Note that the boundary face 11a of the first portion 11 is not limited to such a shape.

In the present exemplary embodiment, the boundary face 11a of the first portion 11 is provided with rigid member support protrusions 11d (support protrusions) protruding out toward the second portion 12 side. As illustrated in FIG. 5, the rigid member support protrusions 11d have a height that contacts the leading end side plate face of the rigid member 3 when the first portion 11 has been placed in the space corresponding to the first portion in the cavity of the mold 20, and the rigid member 3 has been placed in the space corresponding to the rigid member in the cavity of the mold 20.

As illustrated in FIG. 4, in the present exemplary embodiment, the rigid member support protrusions 11d are disposed at both width direction end sides of the boundary face 11a. Each of the rigid member support protrusions 11d projects out further to the second portion 12 side than the crest of the embankment-shaped portion 11c. A face of each of the rigid member support protrusions 11d on the opposite side to the recess 11b is exposed at an outer face of the EA member body 2. Note that the number and placement of the rigid member support protrusions 11d are not limited thereto.

Second Portion Forming Mold 20 Configuration

The internal profile of the cavity of the second portion forming mold 20 has a shape corresponding to the overall external profile of the EA member body 2. As illustrated in FIG. 5 to FIG. 10, in the present exemplary embodiment, the mold 20 includes a lower mold 21 and an upper mold 22. Note that the mold 20 may also include a mold core or the like if required. The lower mold 21 mainly configures a cavity bottom face and side peripheral faces, and the upper mold 22 mainly configures a cavity top face. In the present exemplary embodiment, the EA member body 2 is formed with its leading end side facing downward in the cavity of the mold 20. Namely, the leading end face of the EA member body 2 is formed by the cavity bottom face of the lower mold 21, the side peripheral faces of the EA member body 2 are formed by the cavity side peripheral faces of the lower mold 21, and the base end face of the EA member body 2 is formed by the cavity top face of the upper mold 22. A large depth portion 21a with a comparatively large depth, corresponding to the large thickness portion 2a of the EA member body 2, and a small depth portion 21b with a depth smaller than the large depth portion 21a, corresponding to the small thickness portion 2b of the EA member body 2, are formed inside the cavity of the lower mold 21.

Inside the cavity of the mold 20, in the large depth portion 21a, a space from partway in the depth direction (a position slightly lower than the bottom face of the small depth portion 21b) to the bottom face configures the space corresponding to the first portion, in which the first portion 11 of the EA member body 2 is placed. A space spanning from the bottom face of the small depth portion 21b to an equivalent depth (above the first portion 11) inside the large depth portion 21a configures the space corresponding to the rigid member 3 embedded in the EA member body 2. The bottom face of the small depth portion 21b may be provided with fasteners 23 (magnets) to fasten the rigid member 3 disposed at the bottom face. Note that the fasteners 23 are not limited to magnets. The remaining space inside the cavity of the mold 20 configures a space corresponding to the second portion in which the second portion 12 of the EA member body 2 is formed.

In the present exemplary embodiment, the cavity top face of the upper mold 22 is provided with the rigid member restraint protrusions 22a projecting out into the cavity of the lower mold 21. As illustrated in FIG. 7, the rigid member restraint protrusions 22a are configured so as to contact the rigid member 3 from above when the lower mold 21 and the upper mold 22 are closed after the placement process. In the present exemplary embodiment, the cavity top face of the upper mold 22 is provided with two of the rigid member restraint protrusions 22a with positional relationships corresponding to the respective rigid member support protrusions 11d of the first portion 11.

Each of the rigid member restraint protrusions 22a is configured such that a side face thereof overlaps with the cavity side peripheral face of the lower mold 21 when the lower mold 21 and the upper mold 22 are closed, such that the foamed synthetic resin effectively does not enter between the respective rigid member restraint protrusions 22a and the cavity side peripheral faces of the lower mold 21. Note that the number, placement, and configuration of the rigid member restraint protrusions 22a are not limited to those described here.

EA Member 1 Manufacturing Method

The following first portion preparation process, placement process, and second portion forming process are performed during manufacture of the EA member 1. Note that the first portion-forming synthetic resin raw material configuring the first portion 11 and the second portion-forming synthetic resin raw material configuring the second portion 12 may have the same composition as each other, or may have different compositions to each other.

(1) First Portion Preparation Process

Foam molding of the first portion 11 is performed in advance, separately to the second portion 12. The first portion 11 may be formed using a similar method to one generally used for molding a single molded foam member. Namely, for example, a mold may be preferably employed without any issues arising as long as the mold employed to form the first portion 11 is a mold (not illustrated in the drawings) in which the internal profile of the cavity has a shape corresponding to the external profile of the first portion 11.

(2) Placement Process

In the placement process, first, as illustrated in FIG. 5, the first portion 11 that was pre-prepared in the first portion preparation process is inserted and placed at the far side (the space corresponding to the first portion, toward the bottom of the figure) of the large depth portion 21a inside the cavity of the lower mold 21 configuring the second portion forming mold 20. Next, as illustrated in FIG. 5, the rigid member 3 is placed above the first portion 11 such that another half side of the rigid member 3 is superimposed on the bottom face of the small depth portion 21b (the small depth portion 21b side of the space corresponding to the rigid member), and one half side of the rigid member 3 juts out into the large depth portion 21a (the large depth portion 21a side of the space corresponding to the rigid member). When this is performed, the one half side of the rigid member 3 sits on the respective rigid member support protrusions 11d of the first portion 11. The other half side of the rigid member 3 is fastened to the bottom face of the small depth portion 21b by the fasteners 23, these being magnets or the like.

(3) Second Portion Forming Process

Next, the second portion 12 is foam molded. As illustrated in FIG. 7, the second portion-forming synthetic resin raw material U is fed into the space corresponding to the second portion inside the cavity of the mold 20 (for example above the rigid member 3), and the second portion-forming synthetic resin raw material U is foamed after the upper mold 22 is covered over the lower mold 21 to close the mold.

When closing the mold, the respective rigid member restraint protrusions 22a of the upper mold 22 are contacted from above by the rigid member 3. The respective rigid member restraint protrusions 22a of the upper mold 22 restrain the rigid member 3, which is also restrained by the first portion 11 below the rigid member 3 that is in contact through the rigid member support protrusions 11d.

Figure 8:
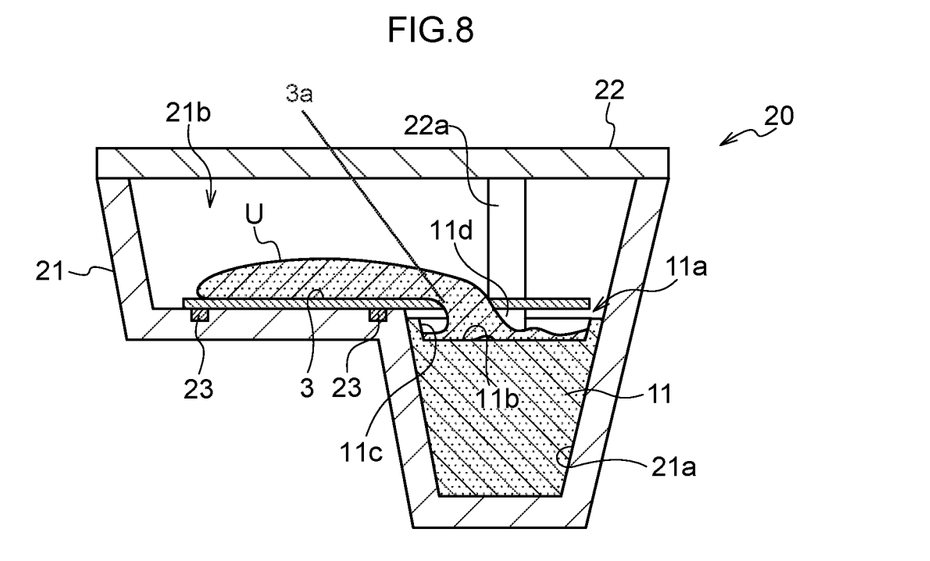
FIG. 8 is a cross-section of a second portion forming mold, illustrating a manufacturing method of the molded foam member illustrated in FIG. 1, as seen from line V-V in FIG. 1.

Since the second portion-forming synthetic resin raw material U has low viscosity immediately after being fed into the space corresponding to the second portion, some of the second portion-forming synthetic resin raw material U flows over the rigid member 3 as illustrated in FIG. 8, and passes through the gap 11e between the rigid member 3 and the cavity inner face of the mold 20 to flow around to the lower side of the rigid member 3 (above the boundary face 11a of the first portion 11). Note that when feeding in the second portion-forming synthetic resin raw material U, the second portion-forming synthetic resin raw material U may, for example, be fed in above the boundary face 11a of the first portion 11 directly through the gap 11e. Accordingly, the second portion-forming synthetic resin raw material U that has flowed around to the lower side of the rigid member 3 is received into the recess 11b provided at the first portion 11, where it collects without overflowing. There is accordingly no concern of overflow of the second portion-forming synthetic resin raw material U seeping between the first portion 11 and the cavity inner face and being foamed therein, thus affecting the shape of the first portion 11.

Figure 9:
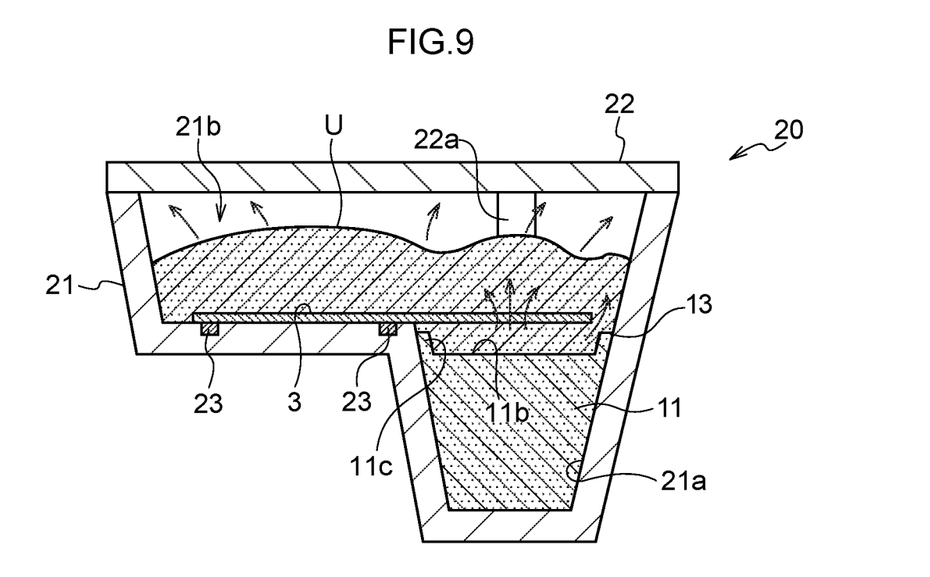
FIG. 9 is a cross-section illustrating the molded foam member manufacturing method illustrated in FIG. 8, illustrating a process following that of FIG. 8.

As illustrated in FIG. 9, the second portion-forming synthetic resin raw material U that has been fed in above the boundary face 11a of the first portion 11 is foamed, filling in between the first portion 11 and the rigid member 3. Since the second portion-forming synthetic resin raw material U contacts the boundary face 11a of the first portion 11, the second portion 12 that is formed by foaming the second portion-forming synthetic resin raw material U thermally welds to the first portion 11 to form a single unit. Some of the second portion-forming synthetic resin raw material U foamed at the lower side of the rigid member 3 expands as far as the upper side of the rigid member 3 through the gap 11e between the rigid member 3 and the cavity inner face of the mold 20. The remaining second portion-forming synthetic resin raw material U is foamed at the upper side of the rigid member 3, and expands so as to fill the space corresponding to the second portion, together with the second portion-forming synthetic resin raw material U from the lower side of the rigid member 3.

When this occurs, each of the rigid member restraint protrusions 22a of the upper mold 22 described above restrain the rigid member 3, which is also restrained by the first portion 11 below the rigid member 3 that is in contact through the rigid member support protrusions 11d, thereby enabling positional displacement and the like of the rigid member 3 and the first portion 11 due to expansion of the second portion-forming synthetic resin raw material U to be prevented.

Figure 10:
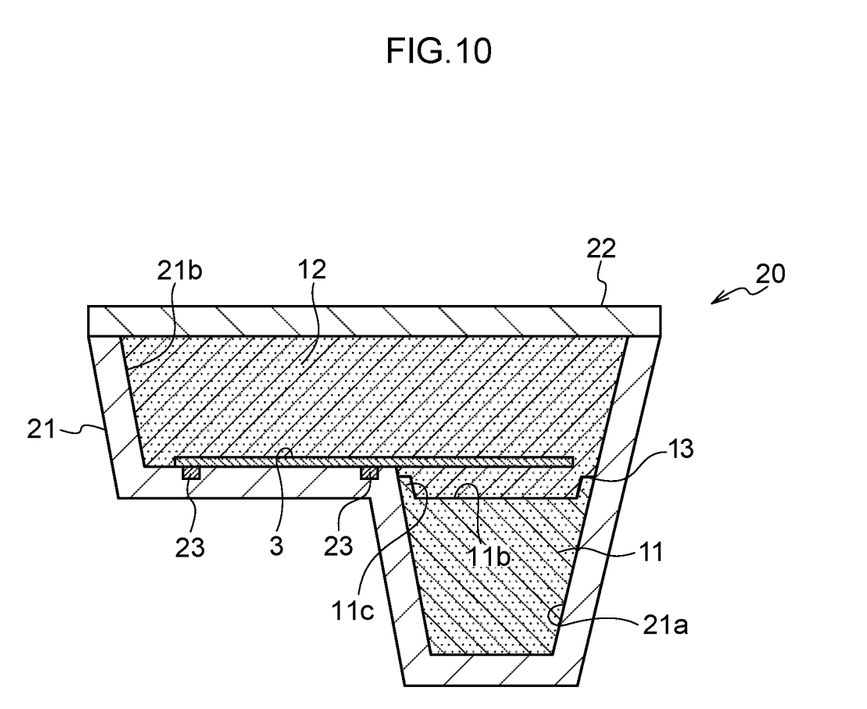
FIG. 10 is a cross-section illustrating the molded foam member manufacturing method illustrated in FIG. 8, illustrating a process following that of FIG. 9.

As illustrated in FIG. 10, filling the space corresponding to the second portion with the foamed synthetic resin formed by foaming the second portion-forming synthetic resin raw material U forms the second portion 12 and completes molding of the overall EA member body 2, as well as embedding the rigid member 3 inside the second portion 12 so as to integrate the rigid member 3 together with the second portion 12.

After the foamed synthetic resin has cured, the lower mold 21 and the upper mold 22 are opened and the EA member body 2 is demolded. The surface of the EA member body 2 is then finished as necessary to complete the EA member 1.

Note that configuration may be made in which the first portion 11 is mass-produced in advance, and only the second portion forming process is performed on the actual EA member production line, or configuration may be made in which the first portion preparation process and the second portion forming process are performed in sequence in a single production cycle of the EA member.

The respective exemplary embodiments described above are merely examples of the present invention, and the present invention may be configured differently from in the above description. For example, in the exemplary embodiment described above, the rigid member 3 serving as an embedded member is partially exposed at an external face of the EA member body 2 serving as a molded foam body.

However, the rigid member 3 may be provided so as to be completely embedded within the EA member body 2, or an entire face of the rigid member 3 may be exposed. The shape of the EA member body 2 may also be set freely.

The disclosure of Japanese Patent Application No. 2013-159774, filed on Jul. 31, 2013, is incorporated in its entirety by reference herein.

All cited documents, patent applications and technical standards mentioned in the present specification are incorporated by reference in the present specification to the same extent as if the individual cited document, patent application, or technical standard was specifically and individually indicated to be incorporated by reference.

EXPLANATION OF THE REFERENCE NUMERALS

1 EA member
2 EA member body (shock absorbing member)
3 rigid member (rigid plate)
11 first portion (first molded body)
11*a* boundary face
11*b* recess
11*c* embankment-shaped portion
11*d* rigid member support protrusions (support protrusion)
11*e* gap
12 second portion (second molded body)
20 second portion forming mold
21 lower mold
22 upper mold
U Second portion-forming synthetic resin raw material (foaming agent)
22*a* rigid member restraint protrusions (restriction protrusion)
23 fastener (magnet)

The invention claimed is:

1. A molded foam member manufacturing method comprising:
a first process of placing a foam molded first molded body and a rigid plate in a forming mold, the forming mold having an upper mold and a lower mold, and pressing and fixing the rigid plate against the first molded body, the rigid plate being provided with a through hole penetrating the rigid plate in a thickness direction thereof; and
a second process of pouring a foaming agent into the forming mold and foam molding a second molded body, the foaming agent passing through a gap provided between the rigid plate and a cavity inner face of the forming mold to flow around to a lower side of the rigid plate such that the rigid plate is embedded within the second molded body, so as to surround at least a portion of the rigid plate and to form an integral unit with the first molded body and closing the lower mold with the upper mold, whereby a plurality of rigid plate restraint protrusions extend from the upper mold and are configured to contact the rigid plate when the lower mold and the upper mold are closed together,
wherein a recess is provided at a portion of the first molded body that contacts the rigid plate, and in the process in which the foaming agent is poured into the forming mold, the foaming agent that has flowed around the rigid plate flows into the recess, and
wherein the rigid plate is provided at a position separated from the recess.

2. The molded foam member manufacturing method of claim 1, wherein, when closing the upper mold configuring the forming mold so as to form a cavity, the rigid plate is pressed against the lower mold configuring the forming mold by the restraint protrusions provided at the upper mold.

3. The molded foam member manufacturing method of claim 1, wherein the first molded body is formed with a support protrusion supporting the rigid plate.

4. The molded foam member manufacturing method of claim 3, wherein the support protrusion is positioned so as to oppose the restraint protrusions in plan view.

5. The molded foam member manufacturing method of claim 1, wherein a magnet is provided in the forming mold for adhering to an exposed portion of the rigid plate.

6. A shock absorbing member manufactured using the molded foam member manufacturing method of claim 1.

* * * * *